US007206590B2

(12) United States Patent
Anson et al.

(10) Patent No.: US 7,206,590 B2
(45) Date of Patent: *Apr. 17, 2007

(54) AUTOMATED CELLULAR TELEPHONE CLOCK SETTING

(75) Inventors: David Anson, Bellevue, WA (US); Alan W. Shen, Seattle, WA (US); Scott R. Shell, Redmond, WA (US); Roman Sherman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 136 days.

This patent is subject to a terminal disclaimer.

(21) Appl. No.: 10/988,874

(22) Filed: Nov. 15, 2004

(65) Prior Publication Data

US 2005/0090272 A1 Apr. 28, 2005

Related U.S. Application Data

(63) Continuation of application No. 09/785,799, filed on Feb. 16, 2001, now Pat. No. 6,826,416.

(51) Int. Cl.
*H04Q 7/20* (2006.01)

(52) U.S. Cl. ........................ 455/466; 455/418; 455/423

(58) Field of Classification Search ................ 455/423, 455/433, 437, 466, 417, 411, 414.1, 420; 370/252, 400, 350
See application file for complete search history.

(56) References Cited

U.S. PATENT DOCUMENTS 4,508,935 A 4/1985 Mastromoro ................ 455/420
5,557,585 A 9/1996 Hanai et al. .................. 368/43
5,878,397 A * 3/1999 Stille et al. ................. 455/466
5,901,115 A 5/1999 Katzmann et al. ............ 368/21
5,920,824 A * 7/1999 Beatty et al. ............... 455/425

(Continued)

OTHER PUBLICATIONS

*A Satellite-Controlled Digital Clock*; J. V. Cateora, D.D. Davis, and D.W. Hanson; *Nat. Bur. Stand*; (Jun. 1976); pp. 1-41.

(Continued)

*Primary Examiner*—Matthew Anderson
*Assistant Examiner*—Tan Trinh
(74) *Attorney, Agent, or Firm*—Merchant & Gould

(57) ABSTRACT

A cellular telephone clock is automatically set to correlate to a timestamp contained in a Short Messaging Service (SMS) status report. Accordingly, an exemplary cell phone clock can be properly set any time the cell phone receives a status report. By setting the cell phone device time to correlate to the world time, the exemplary cell phone clock can be automatically set, without requiring any action by the user and without requiring a special time set control message. When the cell phone transmits an SMS message, the cell phone stores the device time corresponding to the time that the message was sent (DTS). When a status report is received, the exemplary cell phone stores the device time corresponding to the time that the status report was received (DTR). Additionally, the cell phone stores the world time that is included in the status report by the SMSC that handled the message (WT). By subtracting the DTR from the WT, the cell phone can determine an approximate difference between the cell phone's device time (and clock) and the world time. By adding this difference to the current device time (DTC), the DTC can be set to closely approximate the WT.

11 Claims, 5 Drawing Sheets

U.S. PATENT DOCUMENTS

| | | | | |
|---|---|---|---|---|
| 6,097,304 | A | 8/2000 | Hamada | 368/21 |
| 6,138,002 | A | 10/2000 | Alperovich et al. | 455/407 |
| 6,157,618 | A * | 12/2000 | Boss et al. | 370/252 |
| 6,424,841 | B1 | 7/2002 | Gustafsson | 455/466 |
| 6,516,197 | B2 | 2/2003 | Havins et al. | 455/456.1 |
| 6,525,995 | B1 | 2/2003 | Diehl et al. | 368/47 |
| 6,826,416 | B2 * | 11/2004 | Anson et al. | 455/566 |
| 2001/0010499 | A1 | 8/2001 | Hopkins | 340/825.49 |
| 2002/0077116 | A1 | 6/2002 | Havins et al. | 455/456 |
| 2002/0104006 | A1 | 8/2002 | Boate et al. | 713/189 |
| 2003/0017855 | A1 * | 1/2003 | Ishikawa et al. | 455/564 |

OTHER PUBLICATIONS

*PCS Mobility Management Using the Reverse Virtual Call Setup Algorithm*; Chih-Lin 1, Gregory P. Pollini and Richard D. Gitlin; *IEEE/ACM Trans. Networking* 5, 1 (Feb. 1997); pp. 13-24.

* cited by examiner

AUTOMATED CELLULAR TELEPHONE CLOCK SETTING

CROSS REFERENCE TO RELATED APPLICATIONS

This application is a continuation of U.S. patent application Ser. No. 09/785,799, entitled "Automated Cellular Telephone Clock Setting," filed Feb. 16, 2001 (now U.S. Pat. No. 6,826,416), which said application is incorporated herein by reference.

FIELD OF THE INVENTION

The present invention generally relates to setting a clock in a cellular telephone. More particularly, the present invention relates to automatically setting a cellular telephone clock to a correct time and date.

BACKGROUND OF THE INVENTION

Cellular telephones (cell phones) typically have a built-in clock. A cell phone clock can be a hardware component or a software component. Typically, the cell phone clock maintains the current time as the "device time." One of the primary functions of a cell phone clock is to provide the current time to a cell phone user. As cell phones have become more sophisticated and more versatile, cell phone users have come to rely on their cell phones to provide an array of functions, such as access to email, short text message transmission, and Internet browsing. Similarly, users have become accustomed to relying on their cell phones for access to the correct time. Unfortunately, a cell phone's clock can provide the incorrect time for various reasons.

When a cell phone is first used, the clock is not usually correctly set and the user must normally correctly set the clock at least one time. However, like the users of the ubiquitously flashing VCR clock, many cell phone users do not make the effort to correctly set a cell phone clock. A cell phone clock also can provide the incorrect time when the cell phone's battery is allowed to completely discharge or when the battery is disconnected from the cell phone, thereby permitting the clock to lose the ability to store a correct time. Yet another way that a cell phone clock can provide the incorrect time is when a user simply sets the clock with the wrong time.

Regardless of the method by which the clock becomes incorrectly set, a cell phone user will typically desire that the clock is correctly set, so that the user can rely on the cell phone clock for the correct time. One approach to setting a cell phone clock is to send a time set command as a portion of a control message transmitted from a cellular base station to a cell phone. Some cellular telephone networks have a network feature that transmits a current time to cellular telephones on the network. However, there are many cellular networks that do not provide a specific signal, control message, and/or mechanism for providing a time-set function (e.g., GSM networks and TDMA networks). In such networks, there is a need for an automated feature for providing the current time to a cellular telephone. Therefore, there is a need in the art to enable a cell phone clock to be set automatically, without relying on a specialized command message from the cellular telephone system.

SUMMARY OF THE INVENTION

The present invention meets the above-described needs by automatically setting a cell phone device time to match a timestamp contained in a Short Messaging Service (SMS) status report. Accordingly, a cell phone's clock can be properly set any time the cell phone receives an SMS status report.

SMS messages are short electronic messages that can be transmitted from and to cell phones that operate on a Global System for Mobile Communications (GSM) cellular network. The SMS system allows short text/data messages to be sent and received by cell phones or other cellular devices on the GSM network. A sub-network of Short Messaging Service Centers (SMSCs) functions within the GSM network and provides this service by receiving and routing SMS messages.

In addition to permitting users to send an SMS message to a particular recipient's cell phone, the SMS architecture enables the sender to request a status report message to be returned. A status report contains information from the SMSC about the status of the short message, for example, whether or not the message was successfully delivered. In addition, the status report contains a time stamp provided by the SMSC, indicating the time at which the status report was generated by the SMSC. The time provided by the SMSC is referred to as the world time, because it indicates a global network time maintained by the SMSCs operating on the GSM network. By setting the cell phone device time to the world time, the clock on the cell phone is automatically set, without requiring any action by the user and without requiring a special time set control message.

When the cell phone transmits the initial SMS message, the cell phone stores the device time corresponding to the time that the message was sent (DTS). When a status report is received, the cell phone stores the device time corresponding to the time that the status report was received (DTR). Additionally, the cell phone stores the world time that is stamped onto the status report by the SMSC that handled the message (WT).

By subtracting the message sent time from the status report received time, the cell phone can determine how long it took, after the short message was transmitted, for the status report to arrive. This difference represents the maximum error in the final device time (DTE) computed from this method. By subtracting the message-received time from the world time, the cell phone can determine an approximate difference between the cell phone's device time (its clock) and the world time. By adding this difference to the current device time (DTC), the DTC can be set to closely approximate the WT.

In one aspect of the invention, a method is provided for setting a correct time. A status report is received and a world time is determined from the status report. A current device time is set in accordance with the world time.

In another aspect of the invention, a clock for a cellular device is provided. The clock has a current device time for maintaining a current time for the cellular device and a device time difference for maintaining a time difference between the current time and a world time. The clock also has a corrected device time for maintaining the sum of the device time difference and the current device time. The current device time is set equal to the corrected device time, in response to the receipt of the world time; and the world time is received in a status report received by the cellular device.

In yet another aspect of the invention, a cellular telephone is provided. The cellular telephone has a clock operative to provide a displayed time and a radio architecture component operative to receive a status report. The displayed time is set, in response to a receipt of the status report.

The various aspects of the present invention may be more clearly understood and appreciated from a review of the following detailed description of the disclosed embodiments and by reference to the drawings and claims.

DETAILED DESCRIPTION

An exemplary embodiment of the present invention automatically sets a cell phone device time to correlate to a timestamp contained in a Short Messaging Service (SMS) status report. Accordingly, an exemplary cell phone clock can be properly set any time the cell phone receives a status report. By setting the cell phone device time to correlate to the world time, the exemplary cell phone clock can be automatically set, without requiring any action by the user and without requiring a special time set control message.

When an exemplary cell phone transmits an SMS message, the cell phone stores the device time corresponding to the time that the message was sent (DTS). When a status report is received, the exemplary cell phone stores the device time corresponding to the time that the status report was received (DTR). Additionally, the cell phone stores the world time that is included in the status report by the SMSC that handled the message (WT).

By subtracting the DTS from the DTR, the cell phone can determine how long it took, after the short message was transmitted, for the status report to arrive. This difference is the device time error (DTE). By subtracting the DTR from the WT, the cell phone can determine an approximate difference between the cell phone's device time (and clock) and the world time. By adding this difference to the current device time (DTC), the DTC can be set to closely approximate the WT. The maximum error by which the DTC can be incorrect (with respect to the WT) is the DTE.

An Exemplary Operating Environment

Figure 1:
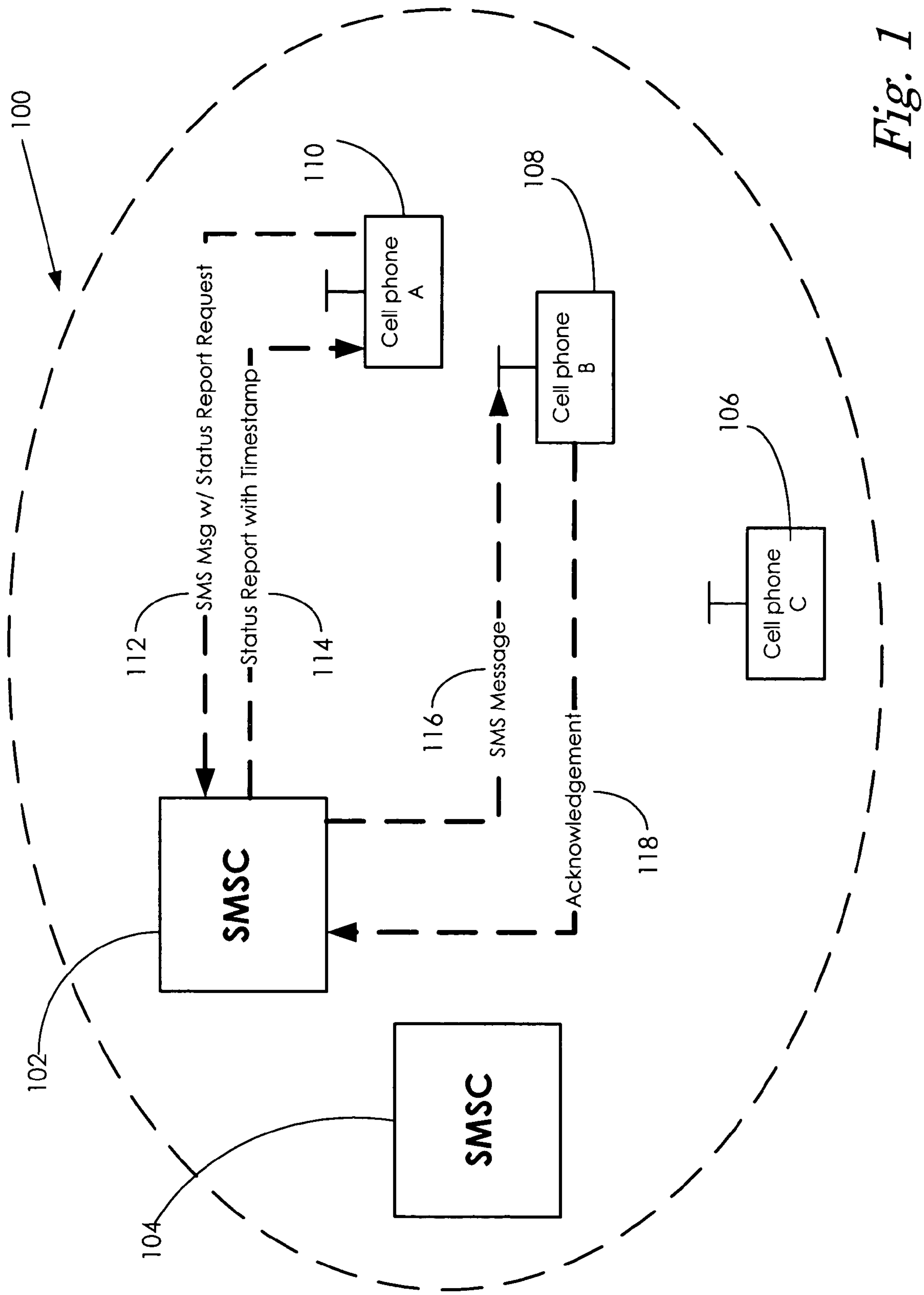
FIG. 1 is a block diagram illustrating an exemplary operating environment for implementation of the present invention.

FIG. 1 depicts an exemplary Global System for Mobile communications (GSM) Cellular Network. GSM Cellular Networks are well known networks that provide communication between cellular telephones and other devices (collectively, cellular devices). A well-known feature of the GSM Cellular Network is the short messaging service (SMS). The SMS permits the transmission of short text and/or data messages between cellular telephones and other devices on the GSM network. In addition to permitting users to send short messages, the SMS architecture also permits a cellular device to request a status report message (SRM).

FIG. 1 depicts an exemplary GSM 100 that includes at least one short messaging service center (SMSC) 102, 104. Among other things, the SMSCs 102, 104 can receive and process SMS messages. For example, cell phone A 110 may transmit an SMS message with a status report request attached 112 to the SMSC 102. The SMSC 102 can determine the cellular device to which the SMS message is addressed and can process the message and transmit the message to the appropriate device (e.g., cell phone B). In the example of FIG. 1, the SMSC 102 transmits the SMS message 116 to cell phone B 108. When cell phone B 108 receives the SMS message 116, cell phone B can transmit an acknowledgement 118 to the SMSC 102. The acknowledgement 118 may be generated when cell phone B 108 receives the SMS message 116, when the user of cell phone B opens and/or reads the SMS message 116, or any other predefined event.

Once the SMSC 102 receives the acknowledgement 118, the SMSC processes the acknowledgement and transmits a status report with a time stamp 114 to cell phone A 110. Notably, the SMSC will send a status report to cell phone A 110 even if the SMS message 116 never reaches cell phone B 108. Thus, an exemplary embodiment of the present invention does not rely on the successful delivery of the SMS message 116. The status report 114 notifies the user of cell phone A 110 that the user of cell phone B 108 has received and acknowledged the receipt of the SMS message that was sent by the user of cell phone A. Before sending the status report 114 to cell phone A 110, the SMSC 102 time stamps the status report with a current world time (WT). The WT represents a universal time maintained by the GSM cellular network. Each SMSC 102, 104 in the GSM 100 has access to the same world time. The time stamp may also include an indication of the time zone in which the SMSC 102, and/or cell phone A 110 reside. Alternatively, the time stamp may contain only a universal world time that may be used by cell phone A 110 to calculate a local time, based on a pre-stored time zone identification.

Figure 2:
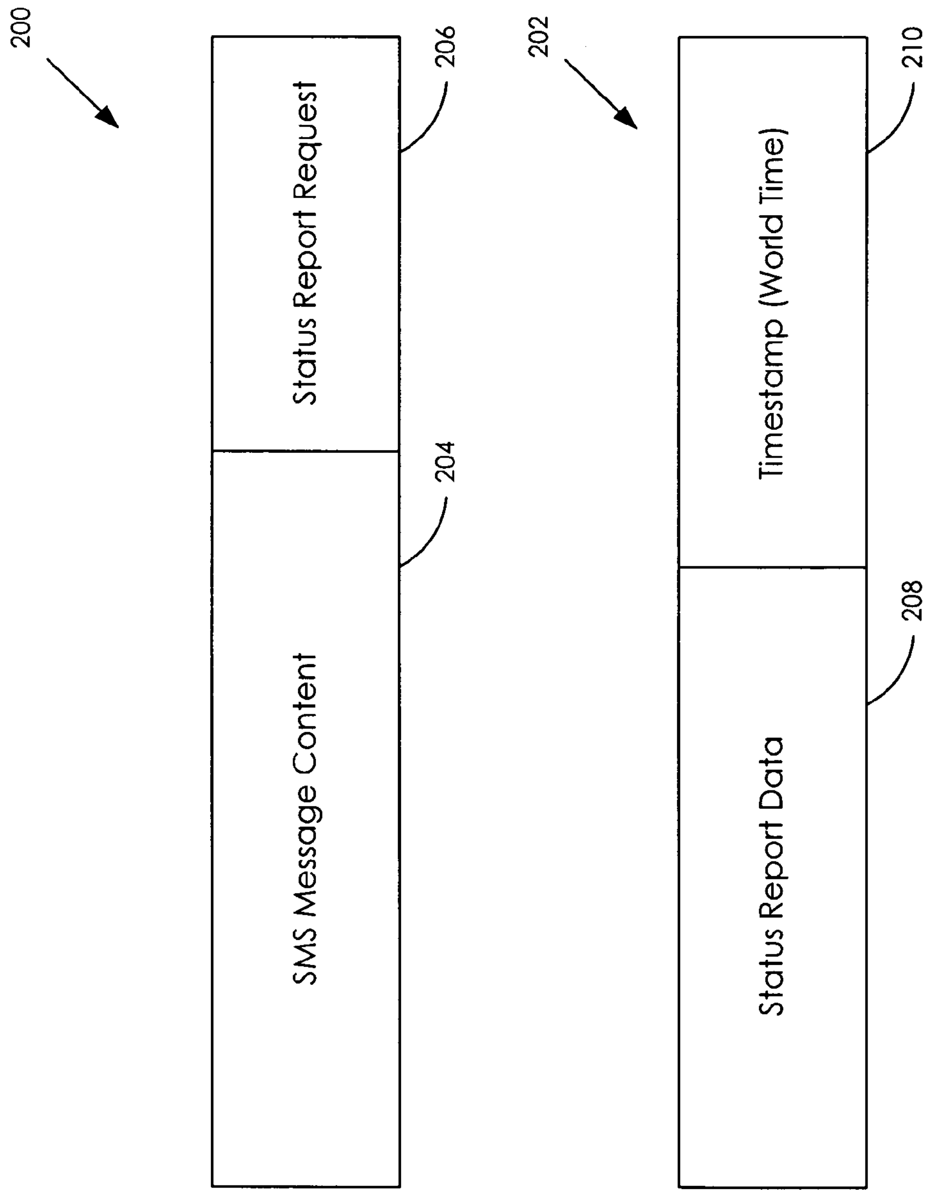
FIG. 2 is a block diagram illustrating some of the primary components of an exemplary short message and an exemplary status report.

FIG. 2 is a block diagram illustrating some of the primary components of an exemplary short message 200 and some of the primary components of an exemplary status report 202. The short message 200 includes an SMS message portion 204 that contains the text and/or data transmitted by a cellular device. As described in connection with FIG. 1, a status report request 206 can be included in the short message 200. The presence of a status report request 206 indicates to the SMSC 102 that the cellular device sending the short message 200 requests an acknowledgement that the short message has been received and/or accessed by the intended recipient cellular device.

The status report 202 can include a status report data portion 208 and a time stamp 210. The status report data 208 can include information pertaining to the acknowledgement sent by the recipient cellular device. Such information may include the time and date on which the recipient cellular device received the SMS message and whether the recipient cellular device user read the short message. The time stamp 210 may include the world time maintained by the GSM and each SMSC within the GSM. The time stamp also may include an indication of the time zone in which the SMSC and/or the sending cellular device reside.

An Exemplary Cellular Telephone

Figure 3:
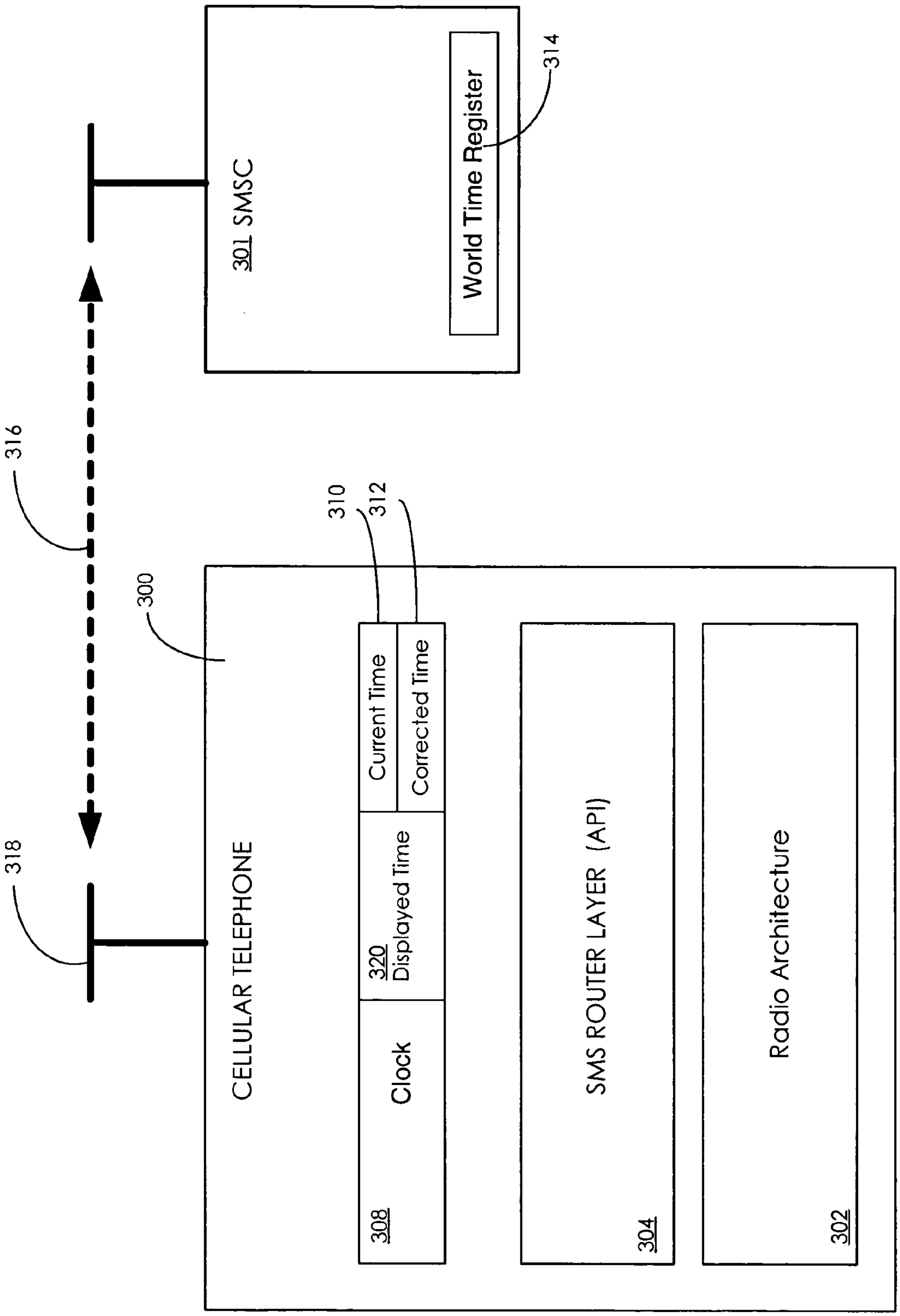
FIG. 3 is a block diagram illustrating some of the primary components of a cellular telephone that is an exemplary embodiment of the present invention.

FIG. 3 is a block diagram illustrating some of the primary components of a cellular telephone 300 that is an exemplary embodiment of the present invention. The cellular telephone 300 communicates with an SMSC 301 via a data communication channel 316. The cellular telephone accesses the data communication channel 316 via a cellular telephone antenna 318. The cellular telephone 300 of an exemplary embodiment of the present invention can use a conventional radio architecture component 302 to communicate with the SMSC 301 and all other elements of the GSM cellular network (e.g., other cellular devices). The radio architecture 302 may, for example, conform to the requirements of GSM specifications. GSM specification 07.05 describes the interface between a cellular radio and the terminal equipment for short messaging. In addition, the SMS messages and status reports transmitted and received by an exemplary embodiment of the present invention can conform to GSM specification 03.40. The contents of the entire body of GSM specifications are hereby incorporated by reference, specifically including GSM specification 03.40 and 07.05.

In an exemplary embodiment of the present invention, the cellular telephone 300 includes a component known as the SMS router layer 304. The SMS router layer provides application programming interfaces (APIs) that provide an interface between applications that send, receive, and process SMS messages and the radio architecture component 302. Accordingly, applications can be independently written and implemented in the cellular telephone 300 without modification to the radio architecture layer 302. By conforming to the protocol of the SMS router layer, SMS messaging applications can take advantage of the functionality of the radio architecture layer 302.

The cellular telephone 300 may also include a clock 308. The clock 308 may be physical component of the cellular telephone. However, the clock may also be an application that is executed by the cellular telephone in conjunction with the SMS router layer, as described above. The clock may include or have access to registers that contain a current time 310, a corrected time 312, and a displayed time 320. The displayed time 320 may be used to maintain the time, as it will be displayed to the cellular telephone user. The current time 310 may be used to maintain a record of the current time as set by a user or by other means. The current time 310 may be distinguishable from the displayed time 320 in that the current time may be stored in a format that is not comprehensible by a user, whereas the displayed time may render the current time in a readable format (e.g., HH:MM:SS). The corrected time 312 may be used to temporarily store a time value to correct the current time 310. A more detailed discussion of an exemplary interaction between the corrected time 312 and the current time 310 is described in connection with FIG. 5.

The SMSC 301 can include a world time register 314. The world time register 314 can be used to maintain a world time that is in turn, maintained by the GSM cellular network. The world time can be transmitted to the cellular telephone 300 via the data communication channel 316. As described above in connection with FIG. 1, the world time could be transmitted as part of a time stamp included in a status report. Those skilled in the art will appreciate that the world time could be transmitted over the data communication channel 316 using any means that conform to the appropriate protocol and/or data communications specification. The world time register 314 may maintain the world time in a generic time format, such as Greenwich Mean Time (or Coordinated Universal Time), or in a specific time format, such as Pacific Standard Time. Alternatively, the world time register 314 may maintain the world time in a generic format and include a time zone indicator that would allow the calculation of the time in a particular time zone by adding or subtracting a pre-stored time zone difference from the world time.

An Exemplary Method for Automatically Requesting a Status Report

Figure 4:
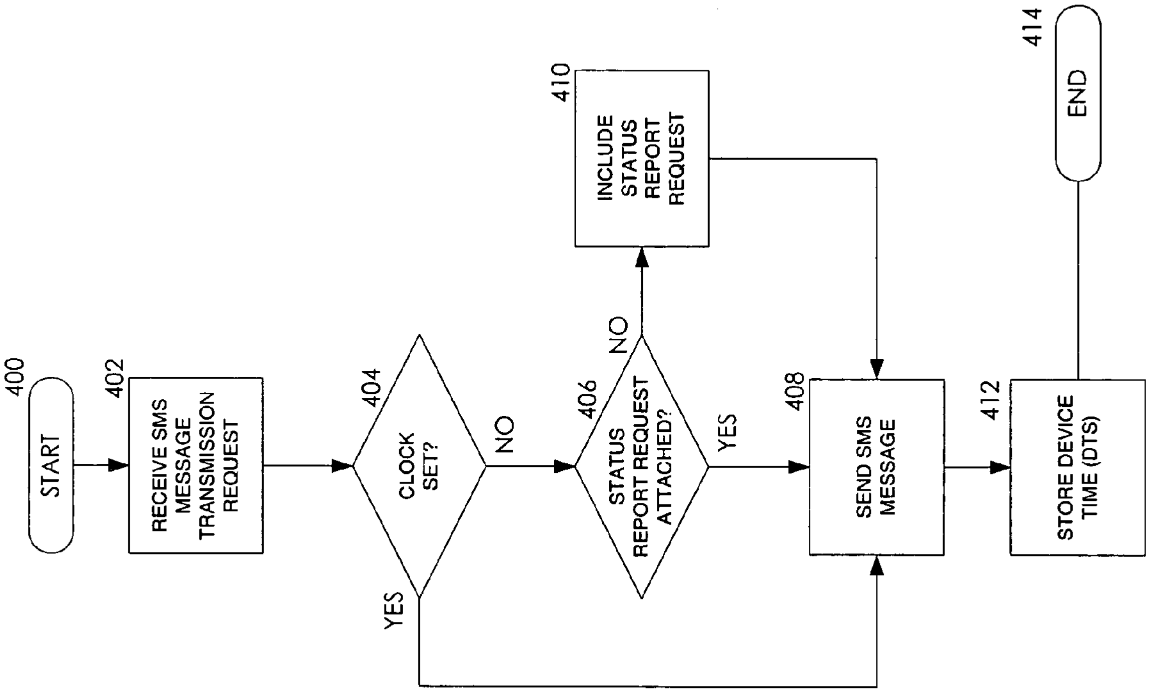
FIG. 4 is a flow chart depicting an exemplary method for including a status report request in an SMS message to automatically determine a correct time.

FIG. 4 is a flow chart depicting a method for including a status report request in an SMS message to automatically determine a correct time. The method starts at step 400 and proceeds to step 402. At step 402, an SMS message transmission request is received. The short message transmission request may be generated by a cellular telephone user attempting to send an SMS message or may be generated by some automated means for sending an SMS message. The method proceeds from step 402 to decision block 404.

At decision block 404, a determination is made as to whether the cellular device's clock is set. If the clock is not set, the method branches to decision block 406. At decision block 406, a determination is made as to whether a status report request has been attached to the short message. If a status report has already been attached to the short message, then there is no need to attach an additional status report request to the short message. Accordingly, if a status report request has been attached to the short message, the method branches to step 408 and the short message is sent with the status report request attached.

Returning now to decision block 404, if a determination is made that the clock has already been set, then the method branches to step 408 and the short message is sent. Because the clock has been set, there is no need to determine whether a status report request is attached. Likewise, there is no need to generate and include a status report request in the short message.

Returning now to decision block 406, if a determination is made that a status report request has not been attached, the method branches to step 410. Because the clock has not been set and no status report request is attached to the short message, a status report request should be attached to trigger the transmission of the world time to the cellular telephone. At step 410, a status report request is included in the short message. The method then proceeds to step 408 and the short message is transmitted with the included status report request.

The method then proceeds to step 412 and the device time (or current time) is stored. The device time is stored to maintain time records in connection with the short message sent and with the status report sent. The device time can be stored in an SMS message log and can be stored in association with the transmitted short message and/or the status report request. The method then proceeds from step 412 to step 414 and ends.

An Exemplary Method for Automatically Determining a Correct Time

Figure 5:
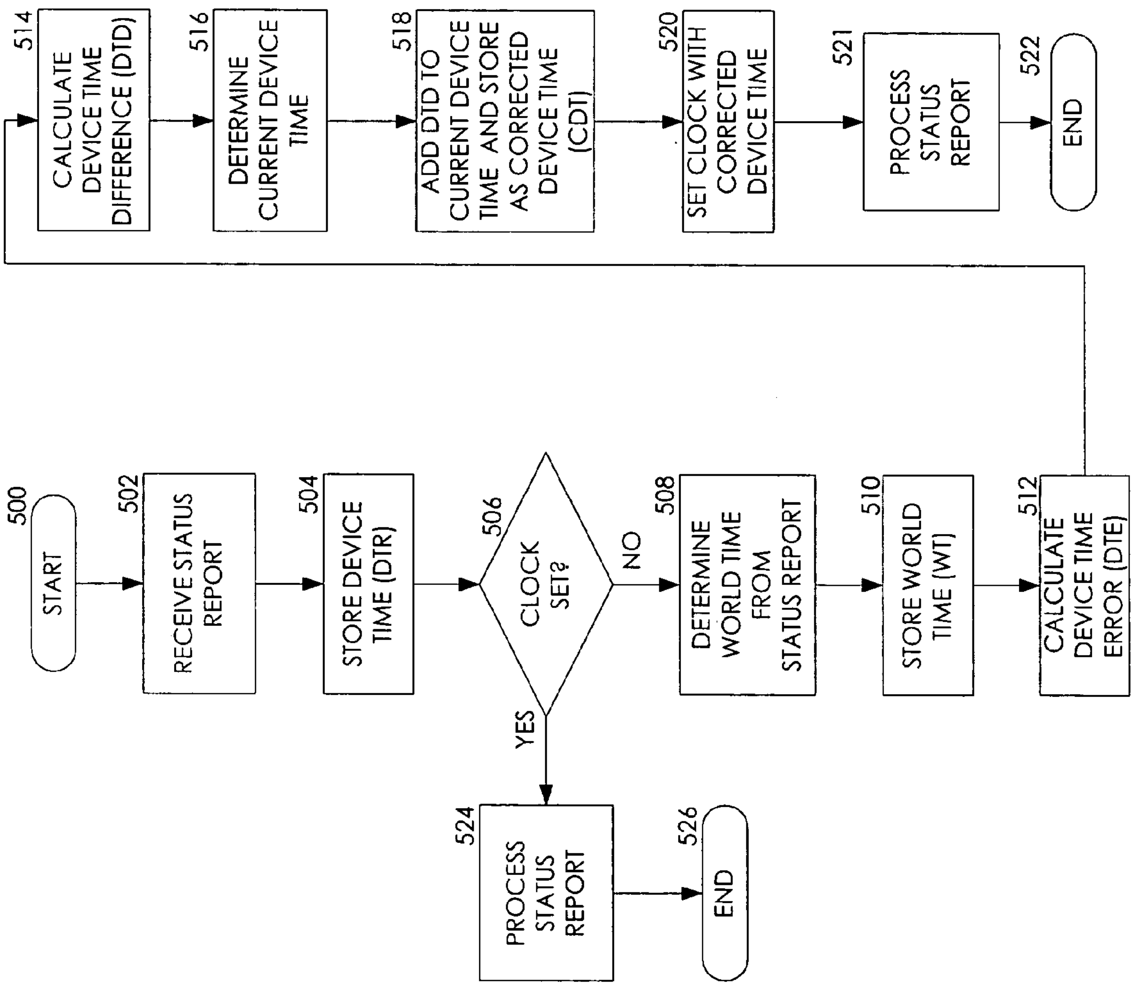
FIG. 5 is a flow chart depicting an exemplary method for automatically determining and storing a correct time, based on a received status report.

FIG. 5 is a flow chart that depicts an exemplary method for automatically determining and storing a correct time, based on a received status report. The method starts at step 500 and proceeds to step 502. At step 502, a status report is received. The method then proceeds to step 504 and the device time is stored. The device time can be stored in association with the received status report to provide evidence as to when a particular status report was received.

The method proceeds from step 504 to decision block 506. At decision block 506, a determination is made as to whether the cellular device's clock is set. If the clock is set, the method branches to step 524. At step 524 the status report is processed in the conventional manner and the method proceeds to step 526 and ends.

In an alternative embodiment, the cellular device's clock could be set at predetermined intervals. In this alternative embodiment, the passing of a predetermined time may be the trigger to reset the clock, instead of a determination that the clock has been previously set. Those skilled in the art will appreciate that various triggers could be used to implement various embodiments of the present invention.

Returning now to decision block 506, if a determination is made that the clock is not set, then the method branches to step 508. At step 508, the world time is determined from the status report. As described above in connection with FIGS. 2 and 3, the world time is placed within a time stamp that is included in a status report.

The method proceeds from step 508 to 510. At step 510, the world time is stored. The method then proceeds to step 512 and a device time error is calculated. The device time error (DTE) represents the difference between the device time when the status report was received and the device time when the original message requesting this status report was sent. As discussed in connection with FIG. 4, the device time can be stored when the cellular device transmits a status report request. Thus, the time between the transmission of the status report request and the receipt of the status report can be determined. This difference is referred to as the device time error (DTE). The DTE represents the upper bound for the error that could affect the accuracy of the cell phone clock. It cannot be determined with complete accuracy when, during that time, the status report was generated by an SMSC.

The method proceeds from step 512 to 514. At step 514, the device time difference (DTD) is determined. The DTD represents the difference between the world time that is determined from the status report and the device time when the status report was received. If, for example, the DTD is 5 hours, then it can be determined that the device time is incorrect and should be advanced about 5 hours. As discussed above in connection with FIG. 3, the world time that is determined from the status report may include an indicator of the time in a specific time zone. Accordingly, another step (not shown) may be added in an alternative embodiment of the present invention to adjust the DTD to accommodate a specific time zone. This adjustment could be made by, for example, adding a pre-stored time zone difference to the received world time. Thus, the time displayed by the cell phone clock will be the time in the time zone in which the cell phone (and presumably the user) resides.

The method proceeds from step 514 to step 516. At step 516, the current device time is determined. As described above in connection with FIG. 3, the current device time can be maintained in a register associated with a clock. Determining the current device time may simply involve accessing the current time register.

The method proceeds from step 516 to step 518. As step 518, the DTD is added to the current device time and the resulting time is stored as the corrected device time. Those skilled in the art will appreciate that adding the DTD to the current device time may actually move the device time back in time, in the case where the uncorrected device time is ahead of the world time. The method then proceeds to step 520 and the clock is set with the corrected device time. This can be done by setting the current time and/or display time equal to the corrected device time. The method then proceeds to step 521 and the status report is processed in the conventional manner. The method then proceeds to step 522 and ends.

Although the exemplary embodiment described initiates an automated clock setting by first determining whether the clock has been set, it will be appreciated by those skilled in the art that various triggers could be used to initiate the automated clock setting procedure. For example, a user could affirmatively initiate the procedure or the procedure could be automatically initiated on a regular interval to maintain an accurate clock setting.

It will also be appreciated by those skilled in the art that the automated clock setting performed by the various embodiments of the present invention is not limited to the arena of the cellular device. Indeed, virtually any signal processing unit that maintains a time and/or date value could be initially set or kept accurate by use of the present invention.

Although the present invention has been described in connection with various exemplary embodiments, those of ordinary skill in the art will understand that many modifications can be made thereto within the scope of the claims that follow. For example, although the embodiments of the present invention have been described in the context of a GSM cellular telephone network, those skilled in the art will appreciate that the invention may be implemented within the context of various cellular networks. Accordingly, it is not intended that the scope of the invention in any way be limited by the above description, but instead be determined entirely by reference to the claims that follow.

What is claimed is:

1. A method for setting a correct time, the method comprising:

in response to a clock set trigger, attaching a status report request to an SMS message;

transmitting the SMS message to initiate the transmission of the status report;

requesting a status report;

storing a first device time corresponding to requesting the status report;

receiving the status report;

storing a second device time corresponding to receiving the status report;

setting a device time error equal to a time difference between the second device time and the first device time;

determining a world time from the status report; and setting a current device time in accordance with the world time;

wherein the step of setting a current device time in accordance with the world time comprises the steps of:

calculating a device time difference between the world time and a current device time;

setting a corrected time equal to the sum of the device time difference and the current device time; and setting the current device time equal to the corrected time, wherein the device time error represents an accuracy of the corrected time.

2. A computer readable medium having stored thereon computer-executable instructions for performing the method of claim 1.

3. The method of claim 1, wherein the clock set trigger comprises a determination that a clock has not been set.

4. The method of claim 1, wherein the clock set trigger comprises passing of a predetermined amount of time.

5. The method of claim 1, wherein the status report is generated by a Short Messaging Service Center.

6. The method of claim 5, wherein the Short Messaging Service Center maintains a world time register.

7. The method of claim 1, further comprising the step of determining a pre-stored time zone indicator.

8. The method of claim 7, further comprising the step of adjusting the current time in accordance with the time zone indicator.

9. The method of claim 1, further comprising displaying the current time as a display time.

10. A method for setting a correct time, the method comprising:

in response to a determination that a clock has not been set, attaching a status report request to an SMS message;

transmitting the SMS message to initiate the transmission of the status report;

requesting a status report;

storing a first device time corresponding to requesting the status report;

receiving the status report;

storing a second device time corresponding to receiving the status report;

setting a device time error equal to a time difference between the second device time and the first device time;

determining a world time from the status report; and setting a current device time in accordance with the world time;

wherein the step of setting a current device time in accordance with the world time comprises the steps of:

calculating a device time difference between the world time and a current device time;

setting a corrected time equal to the sum of the device time difference and the current device time; and setting the current device time equal to the corrected time, wherein the device time error represents an accuracy of the corrected time.

11. A method for setting a correct time, the method comprising:

in response to a passing of a predetermined amount of time, attaching a status report request to an SMS message;

transmitting the SMS message to initiate the transmission of the status report;

requesting a status report;

storing a first device time corresponding to requesting the status report;

receiving the status report;

storing a second device time corresponding to receiving the status report;

setting a device time error equal to a time difference between the second device time and the first device time;

determining a world time from the status report; and setting a current device time in accordance with the world time;

wherein the step of setting a current device time in accordance with the world time comprises the steps of:

calculating a device time difference between the world time and a current device time;

setting a corrected time equal to the sum of the device time difference and the current device time; and setting the current device time equal to the corrected time, wherein the device time error represents an accuracy of the corrected time.

* * * * *